(12) United States Patent
Guillotel

(10) Patent No.: US 6,377,709 B1
(45) Date of Patent: Apr. 23, 2002

(54) PROCESS FOR CODING WITH REGION INFORMATION

(75) Inventor: Philippe Guillotel, Vern sur Seiche (FR)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/121,377

(22) Filed: Jul. 23, 1998

(51) Int. Cl.⁷ .................................................. G06K 9/36
(52) U.S. Cl. ....................................... 382/250; 382/239
(58) Field of Search ................................ 382/239, 250; 341/51; 348/404–407, 419; 358/261.3, 430

(56) References Cited

U.S. PATENT DOCUMENTS

| | | | |
|---|---|---|---|
| 5,214,507 A | * 5/1993 | Aravind et al. | 348/390 |
| 5,263,100 A | * 11/1993 | Kim et al. | 382/166 |
| 5,598,213 A | * 1/1997 | Chung et al. | 348/405 |
| 5,729,294 A | * 3/1998 | Linzer et al. | 348/405 |
| 5,745,178 A | * 4/1998 | Hartung et al. | 348/405 |
| 5,852,669 A | * 12/1998 | Eleftheriadis et al. | 382/118 |
| 5,872,598 A | * 2/1999 | Legall et al. | 348/405 |
| 5,883,979 A | * 3/1999 | Beretta et al. | 382/251 |
| 5,982,937 A | * 11/1999 | Accad | 382/239 |
| 5,986,712 A | * 11/1999 | Peterson et al. | 348/411 |
| 5,999,655 A | * 12/1999 | Kalker et al. | 382/234 |
| 6,023,296 A | * 2/2000 | Lee et al. | 348/405 |

OTHER PUBLICATIONS

M. Barazande–Pour et al., "Adaptive MHDCT Coding of Images", Proceedings of the International Conference on Image Processing (IC, Austin, Nov. 13–16, 1994, vol. 1 of 3, Nov. 13, 1994, Institute of Electrical and Electronics Engineers, pp. 90–94.

M. R. Pickering et al., "A Perceptually Efficient VBR Rate Control Algorithm", IEEE Transactions on Image Processing, vol. 3, No. 5, Sep. 1, 1994, New York, U.S., pp. 527–532.

D. J. Le Gall, "The MPEG Video Compression Algorithm", Signal Processing Image Communication, vol. 4, No. 2, Apr. 1, 1992, Amsterdam, pp. 129–140.

PCT Search Report dated: Mar. 10, 1998.

* cited by examiner

*Primary Examiner*—Yon J. Couso
(74) *Attorney, Agent, or Firm*—Joseph S. Tripoli; Paul P. Kiel

(57) ABSTRACT

The process for the compression of digital data from a video image which carries out a partitioning (4) of the image into image blocks, a Discrete Cosine Transformation (9) of these blocks so as to deliver coefficients and a quantization (10) of each coefficient using a quantization interval, is characterized in that it also carries out a segmentation (2) of the image and a labelling (2) of the regions obtained, and in that it associates with each block a block control interval on the basis of which the quantization interval for each coefficient of the block is defined, the value of which is calculated as a function of these labels.

16 Claims, 1 Drawing Sheet

PROCESS FOR CODING WITH REGION INFORMATION

Figure 1:
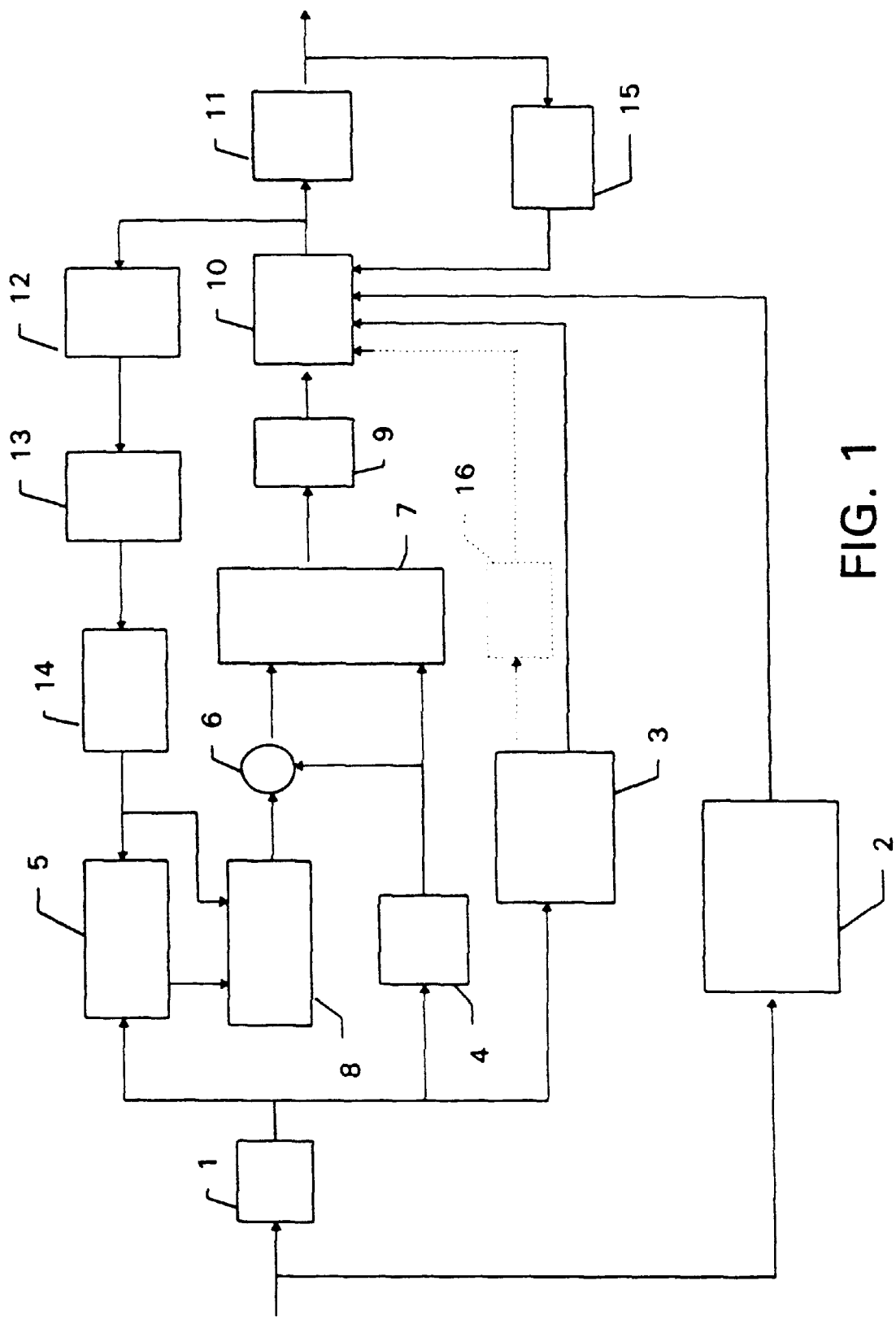

The invention relates to a process for coding digital video data in respect of the compressing of these data and the transmitting of region information relating to the coded video images. It also relates to a device for implementing the process.

Techniques for compressing video data are known as being described, for example, within the MPEG2 standard. However, these techniques do not utilize the data relating to the segmentation of the image, for example region information. The additional information to be transmitted demands a higher cost of transmission for a given image quality or else renders the coding incompatible with the standard.

The purpose of the present invention is to remedy the aforementioned drawbacks.

To this end, the subject of the invention is a process for the compression of digital data from a video image which carries out a partitioning of the image into image blocks, a Discrete Cosine Transformation of these blocks so as to deliver coefficients and a quantization of each coefficient using a quantization interval, characterized in that it also carries out a segmentation of the image and a labelling of the regions obtained, and in that it associates with each block a block control interval on the basis of which the quantization interval for each coefficient of the block is defined, the value of which is calculated as a function of these labels.

The subject of the invention is also a device for the compression of digital data from a video image for the implementation of the preceding process, comprising a circuit for partitioning the image into image blocks, a Discrete Cosine Transformation circuit which carries out such a transformation of the image block into blocks of coefficients, a quantization circuit for quantizing the coefficients belonging to this transformed block on the basis of a control interval, a control circuit which calculates an image control interval as a function of a set-point bit rate for the data output by the device, characterized in that it includes a segmentation circuit which receives the digital data so as to define regions and deliver to the quantization circuit, for each block, a label relating to the region to which it belongs and in that the quantization circuit modifies, before making use thereof, the control interval as a function of this label so as to deliver a block control interval for each image block.

The subject of the invention is also a device for the expansion of video data which receives data compressed according to the above-described process, which video data relate to image blocks belonging to various regions of the image and to control intervals assigned to each block, comprising a circuit for dequantizing the coefficients belonging to an image block, an Inverse Discrete Cosine Transformation circuit which carries out such an inverse transformation of the image block, characterized in that it includes means for determining the region to which the block belongs on the basis of the control interval received in respect of this block.

Thus, the region information is "carried" by the information relating to the control interval.

By virtue of the invention, the region information can be transmitted almost without degrading the quality of the image, for a given transmission bit rate. The coding process remains compatible with the MPEG standard when the latter is adopted.

Other features and advantages of the invention will emerge clearly from the following description given by way of non-limiting example and offered in conjunction with the appended FIG. 1 which represents a device according to the invention.

The device described in FIG. 1 is explained below.

The digital data from the video image are transmitted to the input of the device. This input is linked simultaneously to the input of an image memory circuit 1 which also changes the temporal order of the images and of a circuit for segmentation into regions 2. The output of the image memory circuit is linked to the input of a preanalysis circuit 3, to the input of a circuit for partitioning into image blocks 4, and to the input of a motion estimation circuit 5. The output of the partitioning circuit is linked to a first input of a subtractor 6 and to a first input of a selection circuit 7. The second input of the subtractor originates from an image prediction circuit 8.

The output of the subtractor 6 is linked to a second input of the selection circuit 7. The output of this circuit is linked to a Discrete Cosine Transform or DCT calculation circuit 9. The coefficients obtained are sent to a first input of a quantization circuit 10 and the output of this quantization circuit is linked to the output of the device by way of a variable-length coding or VLC circuit 11. The output of the preanalysis circuit 3 is linked to a second input of the quantization circuit 10. The output of the segmentation circuit 2 is linked to a third input of the quantization circuit 10.

The output of the quantization circuit is also linked to a second input of the motion estimator 5 via, in succession, an inverse quantization circuit 12, an Inverse Discrete Cosine Transform calculation circuit 13 and via a memory 14 which are connected up in series. The output of this memory is also connected to a first input of the prediction circuit 8. The output of the motion estimator 5 is linked to a second input of the prediction circuit 8.

Finally, the output of the VLC coding circuit 11 is linked to a fourth input of the quantization circuit 10 via a control circuit 15.

The input of the device receives the digital video data, for example in the 4:2:0 format. These data are stored in the guise of groups of images in the memory 1 which also ranks these images in a certain order. Each image is partitioned into image blocks by the partitioning circuit 4 which feeds each block of the current image in succession to the input of the selection circuit 7.

The role of the image prediction circuit 8 is to calculate a predicted image from a reconstructed preceding image originating from the memory 14 and from motion vectors transmitted by the motion estimator 5. The predicted block corresponding to the current block is then transmitted to an input of the subtractor and is subtracted from the current block present on the other input so as to deliver a block error or residual as output from the subtractor. The selection circuit 7 chooses, out of the error block or current block, the one having the lowest energy. Choosing the current block implies intracoding of the block; choosing the error block implies interceding. There may of course be several types of interceding, which are not described here, for example those defined in the MPEG2 standard. The choice of coding then also involves these types of interceding. The selected block undergoes a discrete cosine transformation by way of the Discrete Cosine Transform calculation circuit 9 before being transmitted to the quantization circuit 10. The coefficients are then quantized with an actual quantization interval which is a block quantization interval weighted on the basis of a weighting matrix, then undergo a zigzag-type scanning and are then sent to the VLC circuit 11 which carries out a variable-length coding, before they are available as output from the device.

The quantization performed by the quantization circuit 10 depends on the set-point bit rate at the output of the device. A control loop comprising a control circuit 15 makes it possible to control the output bit rate. This bit rate is tapped off at the output of the VLC coder so as to be transmitted to the control circuit which calculates, on the basis of the measured bit rate and of the set-point bit rate, a control interval (made explicit later) from which the quantization intervals are calculated.

The preanalysis circuit 3 performs a preanalysis of the image, that is to say it calculates the bit rate of the image to be coded for a quantization interval determined on the basis of the preceding codings. From this it deduces an image quantization interval which may possibly be corrected by the control loop.

The quantized coefficients of the current lock, which are available as output from the quantization circuit 10, are transmitted to an inverse quantization circuit which reconstructs these coefficients and then to an inverse discrete cosine transform circuit which reconstructs the block of the current image. The blocks are stored in the memory 14 which delivers the reconstructed or reconstituted image on its output. The motion estimator 5 compares the current block received on one input with the reconstructed image received on the other input so as thereby to deduce a motion vector assigned to this current block and transmitted to the image prediction circuit 8. The latter transmits a predicted block to the subtractor, this being the reconstructed-image block shifted by the motion vector relative to the current block being processed.

The digital video data input to the device are also transmitted to a segmentation circuit 2. The role of this circuit is to define, in the image, zones or regions which meet certain criteria, for example uniformity or motion criteria. A basic segmentation is, for example, the identifying of an object with respect to the background of the image, for example a presenter with respect to a uniform background.

A matrix of coefficients which assigns a region number or label to each block of the image as a function of the region to which this block belongs is then transmitted to the quantization circuit.

The segmentation circuit can carry out this segmentation on the basis of a motion estimate, the motion vector field and the luminance gradients making it possible to define the regions on the basis of the uniform zones (homogeneous motion) and of their boundaries (gradients). In this case, the motion vectors calculated by the circuit can be transmitted to the image prediction circuit, possibly after these vectors are shaped (for example a conversion of the pixels/blocks type if the motion estimate is made at pixel level), so rendering the motion estimator 5 unnecessary.

The segmentation circuit also performs storage and reordering of the images in a way akin to that carried out by the image memory circuit 1 so as to deliver the information on its output in a synchronous manner.

In actual fact, according to the MPEG standard, the coding device transmits a control interval known within the standard as a Quant_Scale_Code, rather than a quantization interval.

More exactly, it transmits this interval together with each macroblock consisting of several image blocks, all the operations described above being, in the MPEG standard, carried out on macroblocks and not image blocks. The subsequent reasoning will pertain equally to macroblocks or image blocks.

The value of a control interval calculated by the quantization circuit and the value of the motion vector delivered by the motion estimator if necessary (the link between the motion estimator and the coding circuit which also carries out this multiplexing, which is not represented in FIG. 1) are transmitted, among other things and after variable-length coding by the circuit 11, together with each macroblock of intracoefficients or of residuals. In intramode, this motion vector is not necessary.

In one example, the quantization interval $q_r$ (i, j), this being the quantization interval which is actually applied to a coefficient with index i, j corresponding to row i and column j in the block of coefficients, is related to the control interval q for the block by the formula:

$$q_r(i, j) = \frac{v(i, j) \times f(q)}{16}$$

v(i,j) is a weighting coefficient of the weighting matrix, which weighting is applied to the coefficients before they are quantized.

f(q) is a linear or nonlinear law relating the control interval q to the block quantization interval f(q) applied to the block.

More generally, the control interval, which will also be referred to as the block control interval, is defined as the parameter transmitted by the compression device for each block or macroblock, the value of which is a function of the actual quantization interval applied to the coefficients of the block or macroblock.

The matrix of labels which is transmitted by the segmentation circuit acts directly on the control interval, calculated in a conventional manner on the basis of the control circuit, so as to modify it. It is the corresponding modified quantization interval which is actually used to quantize the coefficients, the modified control interval (block control interval) being transmitted, together with the compressed data, to the decoder, thus "transporting" the region information.

To carry out this modification, each region is allocated an incrementation or decrementation value, a different value for each region, which is then applied to the value of the control interval as calculated by the control circuit. The values are also distributed about the control interval value calculated by this circuit so as to maintain a mean value which is equal or close thereto so as to avoid disturbing this control.

For example, if the calculated value of the control interval is 20 and if the number of regions to be transmitted is 5, it will be possible to choose to quantize the coefficients of a macroblock with a block control interval (this being an integer value) of between 18 and 22 depending on the region to which it belongs.

The influence of this modification on the quantization interval is small and will be less great on the low-frequency coefficients which are coded with a smaller quantization interval than on the high-frequency coefficients.

Under VBR (Variable Bit Rate) type operation for which the bit rate at the output of the device can vary over time, the modifying of the quantization interval, and consequently of the bit rate, causes no impairment.

Under CBR type (Constant Bit Rate) operation for which a constant mean bit rate is sought, the control procedure generally adapts the quantization interval for the last strips of the image or "slices" according to the terminology employed in the MPEG standard, as a function of the bit rate measured for the previous slices and of the set-point bit rate, in such a way as to come closer to this set-point bit rate. The region information would then be lost and this control procedure is therefore disabled inside an image. Control is now performed at image level rather than at slice level.

Simply put, the speed of latching to the set-point bit rate, or response time, is slower and the instantaneous bit rate is less constant.

It is also possible to define fallback modes to guarantee against any malfunction. For example, returning to conventional strip-based control should the buffer be in danger of drying up or overflowing. The fact that the block control interval becomes fixed per strip, whereas it varied for each block as a function of region, will inform the decoder of the change of operation, this change being transparent to a conventional decoder which utilizes the MPEG standard. It will then be possible to reconstruct the region information, for example from a correlation with the image, or with the preceding images, or more simply is unavailable in these alarm cases.

An improvement to the device according to the invention is described below.

Returning to the diagram of FIG. 1 in which the modification is represented dotted, a second output of the preanalysis circuit 3 is connected to the input of a circuit for calculating spatial tuning coefficients 16. The output of this circuit is linked to a fifth input of the quantization circuit 10.

The purpose of this circuit is to calculate, for each macroblock, a coefficient which reflects the spatial characteristics of the image, namely to determine the macroblocks for which the eye is more sensitive to errors than for the others.

For example, for the macroblocks belonging to a zone of the image which is highly textured, the value of the coefficient is close to 1, this value decreasing as the zone to which it belongs becomes more uniform. These coefficients are deduced from the calculation of the energy or the cost of coding the macroblock, performed during preanalysis of the image. The macroblocks belonging to uniform zones yield smaller energy than those belonging to textured zones and therefore smaller coefficients will be allocated to them.

Another criterion employed uses the temporal information contained in the displacement or motion vectors. For a zone moving more slowly than the majority of the scene, the coefficient is smaller than for the remainder of the image. Thus, these zones are favoured.

These criteria may also be defined manually, the user defining particular zones of the image which he wishes to favour. This is a case of subjective quality control performed by the operator.

A matrix of spatial coefficients which assigns a coefficient to each macroblock and is termed a correction mask is thus calculated for each image by this circuit for calculating spatial coefficients and is transmitted to the quantization circuit 10.

On the basis of the matrix of region numbers delivered by the segmentation circuit 2, the quantization circuit averages the spatial coefficients region-wise so as to obtain one and the same coefficient per region.

In this variant, instead of carrying out the incrementation and decrementation operations, the quantization circuit carries out an operation of multiplying the quantization intervals, obtained in the conventional manner, by these averaged coefficients and then a rounding of the calculated value of the control interval so as to determine a new integer control interval. If the averaging of the spatial coefficient (identical values may be obtained) or this rounding leads to two identical control intervals for different regions, the nearest neighbouring integer value will then be chosen so as to eliminate this identity.

Thus, the control interval (or quantization interval) is no longer modified randomly on the basis of the region labels but by taking into account the spatial and temporal characteristics of the image, thereby improving the quality of the image for the same bit rate.

For example, for a spatial weighting, the uniform zones, which correspond to a lower spatial coefficient, are coded with a smaller quantization interval and the textured zones, which correspond to a higher coefficient, are coded with a larger quantization interval. Now, the greater the variation in the quantization interval from one block to another (and hence the interval itself), the greater are the effects of blocks, and the eye of the viewer is less sensitive to the effects of blocks in the textured zones than in the homogeneous zones.

Rather than averaging the spatial coefficients a over each region, it is equally possible to choose one value a per region, for example the minimum or maximum value out of those of the macroblocks belonging to the same region. A check will be made as to whether two different regions are coded by different values of the control interval and if this is not the case, the value found to be identical will, for example, be incremented or decremented.

At the decoder the regions are determined by the various control interval values received in respect of an image.

Temporal tracking of the regions is moreover possible (but not necessary) at image sequence level, with a few additional constraints.

For example, based on the current macroblock assigned to a region n and on the motion vector matching it with a macroblock of the preceding reconstructed image, this macroblock assigned to a region m, it is possible to deduce that the region with label m of the preceding image corresponds to that with label n of the current image.

The determination of the region at the decoder can also be done by averaging, over the image, the control interval transmitted by the coder. The control interval calculated by the control circuit at coder level varies from one image to another, in particular when changing the type of coding, for example from intra to inter. On averaging the control interval over the image, the value obtained corresponds to the control interval calculated by the coder control circuit, the control circuit working on this mean interval. The discrepancy between the control interval received and the mean control interval calculated at the decoder in the case where the coder operates by incrementing or decrementing this interval therefore allows temporal tracking, if at the coder it is ensured that the same region labels are maintained from one image to another.

In the case involving the spatial coefficient, the value of a is determined by a simple division by the mean interval. The value of a which gives the region information must then be kept constant over time for a given region.

The region information is limited to the accuracy of the macroblock. It is however possible to refine this resolution, for example by accurately calculating the boundaries by the method of gradients, when the decoder, or an application specific to the decoder, requires more accurate information.

In the examples given it is the control interval which transports the region information since it is this interval which is transmitted to the decoder under the MPEG standard. It is of course equally possible to envisage this information being carried by the quantization interval, any value which is a predefined function of the quantization interval, or any other information linked with the coding of a macroblock and transmitted to the decoder together with the macroblock (motion vectors, etc.), when it is information of this type which is transmitted, on condition of course that the modification made to the transmitted information has hardly any impact on the quality of the decoded image.

What is claimed is:

1. A method for the compression of digital data from a video image which carries out a partitioning of said image into image blocks, a Discrete Cosine Transformation of said blocks so as to deliver coefficients and a quantization of each coefficient using a quantization interval, comprising the steps of:

segmenting said image into regions to define objects in said image;

labeling said regions, each label defining a region;

associating a respective label to each of said image blocks according to the region to which each image block belongs; and associating with each block a block control interval on the basis of which said quantization interval for each coefficient of a block is defined, the value of which is calculated as a function of an associated label.

2. The method according to claim 1, wherein:

said function is one or more incrementations or decrementations of a control interval value calculated for said image as a function of a set-point bit rate, and in that two different block control intervals correspond to two different regions.

3. The method according to claim 2, wherein:

said incrementations or said decrementations are uniformly distributed about said control interval value calculated as a function of said set-point bit rate, so as to maintain a mean bit rate corresponding to said set-point bit rate.

4. The method according to claim 1, further comprising the step of:

calculating a complexity coefficient for each block, wherein said calculation of said block control interval is a function of said coefficient.

5. The method according to claim 4, wherein said complexity coefficient is a spatial complexity coefficient reflecting spatial uniformity of a respective block calculated as a function of its energy.

6. The method according to claim 4, wherein said complexity coefficient is a temporal complexity coefficient calculated as a function of the amplitude of displacement of a respective block from one image to another.

7. The method according to claim 4, wherein said complexity coefficient is calculated by manually selecting favored zones.

8. A device for the compression of digital data from a video image comprising:

a circuit for partitioning the image into image blocks;

a Discrete Cosine Transformation circuit for transformation of an image block into a block of coefficients;

a quantization circuit for quantizing said coefficients belonging to said coefficient block on the basis of a control interval;

a control circuit which calculates an image control interval as a function of a set-point bit rate for data output by said device;

a segmentation circuit for determining objects in said image, for labeling said objects, and for associating a respective label to each of said image blocks according to the object to which each image block belongs to deliver said labels to said quantization circuit, wherein said quantization circuit modifies, before making use thereof, said control interval as a function of a particular label so as to deliver a block control interval for said image block.

9. The device according to claim 8, wherein;

said quantization circuit increments or decrements the value of said control interval for calculating quantization intervals, and wherein two different block control intervals correspond to two different regions.

10. The device according to claim 8, wherein:

said digital data are transmitted to a preanalysis circuit which calculates spatial coefficients for said image block as a function of spatial uniformity of image blocks, and wherein said control interval is modified as a function of said spatial coefficients.

11. The device according to claim 8, wherein:

said digital data are transmitted to a preanalysis circuit which calculates spatial coefficients for said image block as a function of amplitude of relative motion of said image block with respect to corresponding motion of a preceding image, and wherein said control interval is modified as a function of said spatial coefficients.

12. The device according to claim 8, wherein:

said digital data are transmitted to a preanalysis circuit which calculates spatial coefficients for said image block as a function of data supplied by a user, and wherein said control interval is modified as a function of said spatial coefficients.

13. A device for the expansion of compressed video data, which video data relate to image blocks belonging to various regions of an image and to control intervals assigned to each image block, a control interval of an image block being calculated as a function of a label attributed to the region to which the image block belongs, comprising:

a circuit for dequantizing coefficients belonging to a particular image block for producing a dequantized image block;

an Inverse Discrete Cosine Transformation circuit for inverse transformation of said dequantized image block; and means for determining a region to which said particular image block belongs from a control interval received in respect of said particular image block.

14. The device according to claim 13, wherein:

said means carry out an averaging of said control interval received in respect of each block over said image and a calculation relating to a mean interval.

15. The device according to claim 13, wherein:

said data received relating also to motion vectors associated with said blocks, and wherein a region tracking from one image to another is performed on the basis of said motion vectors.

16. The device according to claim 13, wherein:

labels defining said region are kept identical over time for said region and wherein said label is defined by discrepancy between said control interval transmitted and a mean control interval for said image.

* * * * *